Sept. 2, 1969 C. E. G. LIND 3,464,358
PUMP DRIVEN BY AN ELECTRIC MOTOR
Filed Aug. 17, 1967 5 Sheets-Sheet 1

Inventor
Carl Eric Gottfrid Lind
By
Attorney

Sept. 2, 1969    C. E. G. LIND    3,464,358
PUMP DRIVEN BY AN ELECTRIC MOTOR

Filed Aug. 17, 1967    5 Sheets-Sheet 2

Inventor
Carl Eric Gottfrid Lind
By: *signature*
Attorney

Sept. 2, 1969   C. E. G. LIND   3,464,358
PUMP DRIVEN BY AN ELECTRIC MOTOR
Filed Aug. 17, 1967   5 Sheets-Sheet 3
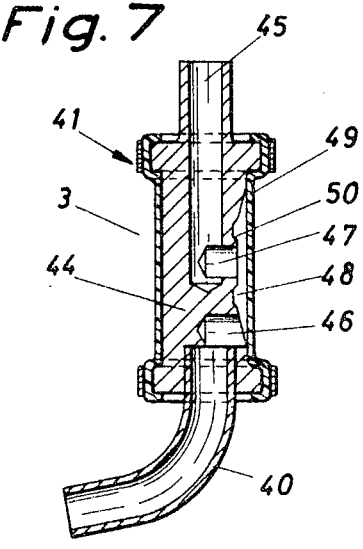
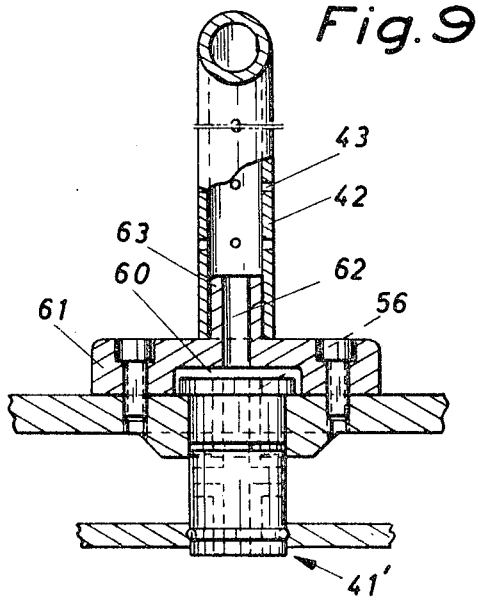
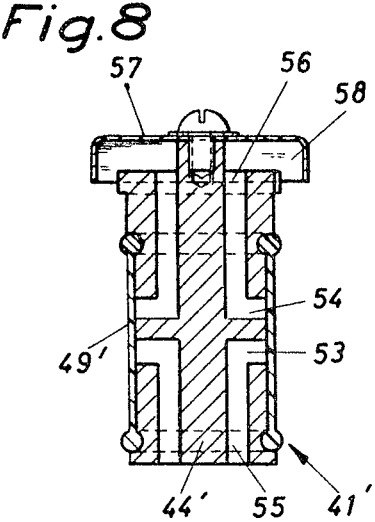
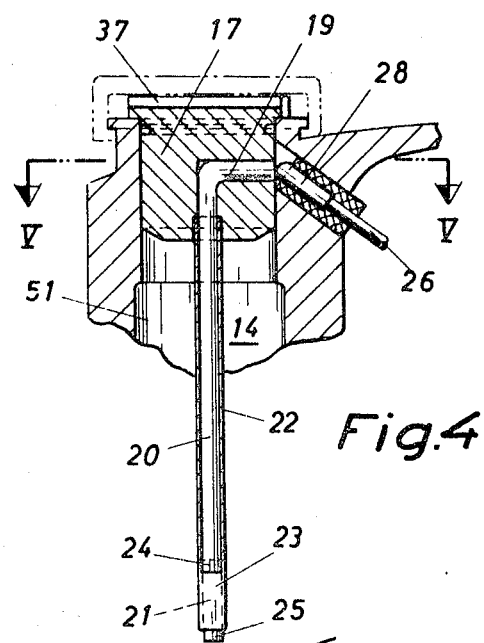
Inventor
Carl Eric Gottfrid Lind
By: B.F. Ahlringer
Attorney

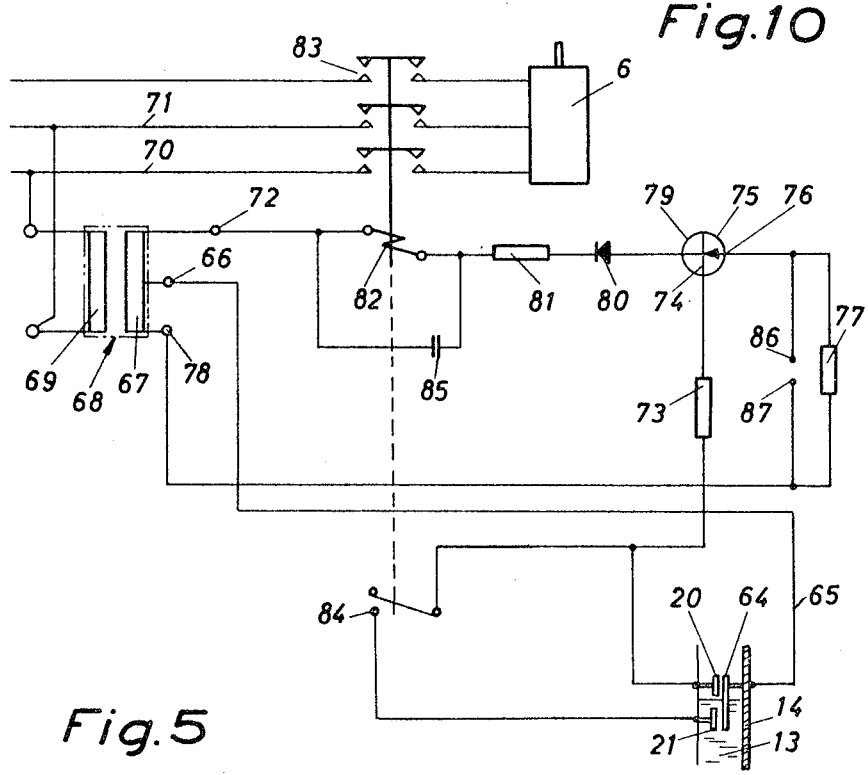
Fig. 10
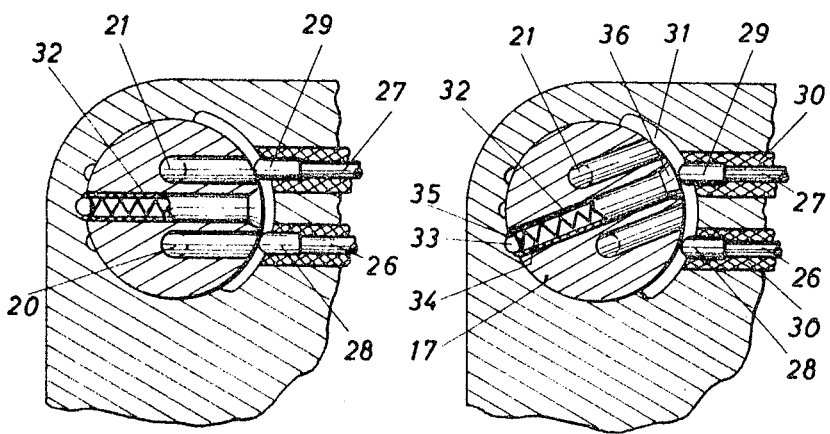
Fig. 5
Fig. 6
Inventor:
Carl Eric Gottfrid Lind

United States Patent Office 3,464,358
Patented Sept. 2, 1969

3,464,358
PUMP DRIVEN BY AN ELECTRIC MOTOR
Carl Eric Gottfrid Lind, Partille, Sweden, assignor to Aktiebolaget Svenska Precisionsverktyg, Planiavagen Nacka, Sweden, a corporation of Sweden
Filed Aug. 17, 1967, Ser. No. 661,411
Claims priority, application Sweden, Aug. 23, 1966, 11,336/66
Int. Cl. F04b 49/02; F04d 15/00; E03b 5/00
U.S. Cl. 103—25                              10 Claims

ABSTRACT OF THE DISCLOSURE

A pump housing has a motor disposed centrally within it, a flow chamber surrounding the motor, and an electrode chamber partitioned off from the flow chamber but communicating through a tube at its bottom with the flow chamber. An impeller mounted on the bottom end of the motor shaft drives liquid upwardly out of the flow chamber and through an outlet at the top of the housing. Mounted in the electrode chamber are electrodes. When the electrically conductive liquid being pumped reaches the electrodes a circuit is closed to start the motor. The electrode chamber is closed at its top so that air is trapped in the top of this chamber by the liquid therein. An air outlet valve maintains the liquid level in the electrode chamber when the pump is operating, but vents the electrode chamber when the liquid level in the flow chamber drops to a predetermined level. The air pocket provides space in which the electrodes are kept dry adjacent the terminals which connect them with the motor.

---

Figure 1:
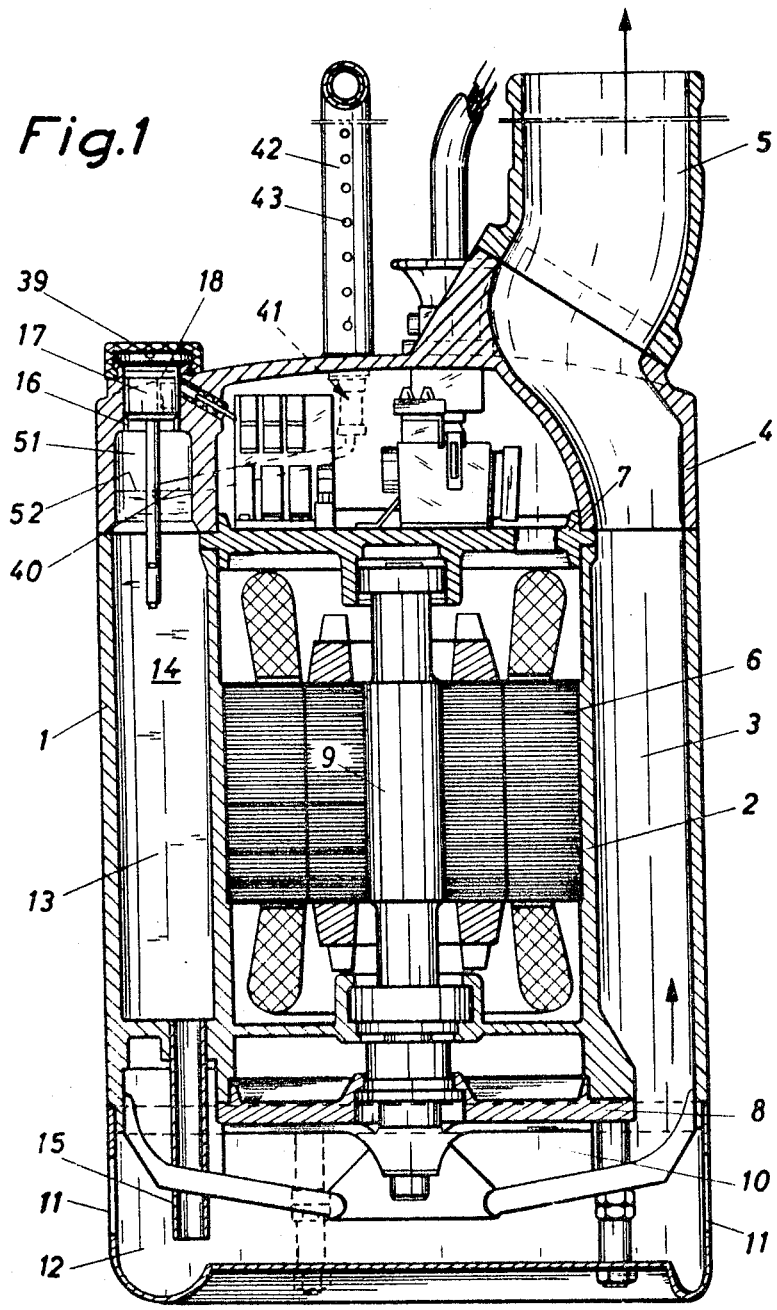

This invention relates to pumps driven by an electric motor.

More particularly this invention relates to pumps driven by an electric motor and destined for pumping of electrically conductive liquid, such as contaminated water, for example, and provided with electrodes in an electric circuit which also includes the control coil of a contactor or similar member in the starting circuit of the electric motor, said electrodes being disposed so as, when liquid is present between them, to close the control circuit and thereby to energize the contactor to start the motor and, when the liquid level falls below the electrodes, to interrupt the control circuit and thereby also to release the contactor for stopping of the motor.

In a construction known in the prior art the electrodes are located horizontally in front of one another within a chamber. The one electrode is attached to the pump casing by means of a threaded connection, and it is possible by screwing in this electrode towards the opposed fixed electrode to bring about a short-circuit e.g. a direct current passage through the electrodes without passage through the liquid (water) in the electrode chamber, which can be desirable in some cases. This construction has, however, the following drawbacks.

(a) By repeated screwing in and out of said electrode the screw threads after some time will have too much play so that air will penetrate into the electrode chamber whereby the liquid level in the chamber will be lowered and unintentional stopping of the pump motor be caused.

(b) The electrodes have little extension only in the vertical direction for which reason they will easily become wetted by splashes from the liquid present in the chamber. The wet surface forms a current bridge to the wall of the chamber which results in that the pump motor will not be stopped in spite of the electrode chamber having been drained of liquid, and (c) The electrodes are difficult to reach for effective survey and cleaning.

One main object of the present invention is to remove the drawbacks mentioned above. According to one characteristic feature of the invention the pump is provided with a bottom-open chamber which is closed at the top and provided with one or several substantially vertical electrodes, said electrode chamber in addition having an air outlet located so as to cause an air cushion to be formed above the air outlet and the liquid level in the electrode chamber, part of at least one of the electrodes extending through said air cushion. Due to this air cushion located above the liquid level in the electrode chamber and vertically passed by the electrodes and effectively sealed, most suitably by means of a stopper, the electrodes above the liquid level are kept dry and thus no current bridge can be formed here. No sealing problems exist, since it is easy to seal the stopper which is of cylindrical shape by means of a common O-ring against the bore in the electrode chamber into which it has been inserted. The stopper with the electrodes is easy to remove for inspection and cleaning of the latter. The electrodes have great dimension in the vertical direction and can be provided with a long electrical insulating layer which eliminates the risk of short-circuiting due to a current bridge through a wet surface layer. Only the lowermost ends of the electrodes need to be uncovered which ends therefore easily and at low expense can be covered with a noble metal, such as platinum, for example.

According to a valuable embodiment of the invention the stopper is provided with a short-circuiting contact for by-passing or shunting of the electrodes. Suitably contact pins are provided in the wall of the electrode chamber and the stopper is partially rotatable so that one of the contact pins is brought to electrically conductive connection with the short-circuiting contact.

According to another preferred embodiment of the invention two vertical electrodes of different length are attached to the stopper, the shorter electrode being adapted to act as starting electrode and the longer electrode as holding electrode for keeping the circuit through the control coil of the contactor closed through the liquid, even if the liquid level is slightly below the lower end of the shorter or starting electrode. In this way smooth and undisturbed starting of the pump motor is ensured. Splashes to and fro of the liquid in the electrode chamber will thus not disturb the progress of the starting operation, since the holding electrode which during the starting operation continuously with its lower end dips into the liquid in the electrode chamber, makes sure that the control coil of the contactor will be supplied with current and thus keep the contactor closed.

In order to prevent the electrodes in the chamber from becoming soiled by the liquid drawn up by the pump, the air outlet from the chamber is according to the invention provided with a valve having an annular seat enclosed by a sleeve-shaped membrane which is adapted by the action of positive pressure prevailing in the pump chamber to encase the annular seat in a sealing manner. A valve of this type will seal the air outlet when the pump begins to operate so that contaminated liquid cannot penetrate into the electrode chamber through the air outlet, but will open immediately when the pump ceases to feed liquid. The most important purpose of the valve is to maintain the liquid in the electrode chamber at the required high level until the liquid level outside of the pump has been lowered sufficiently to allow air to penetrate into the electrode chamber at the lower end thereof, so that the liquid in said chamber is forced to drain off.

Figure 2:
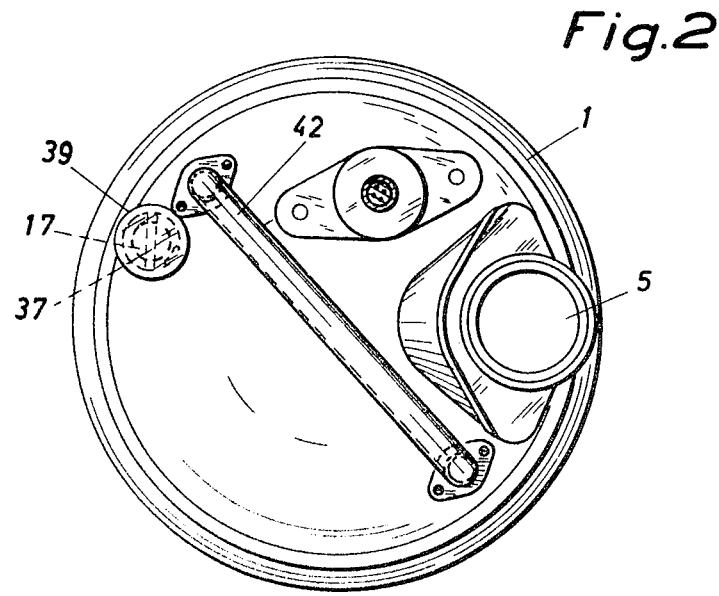
Figure 3:
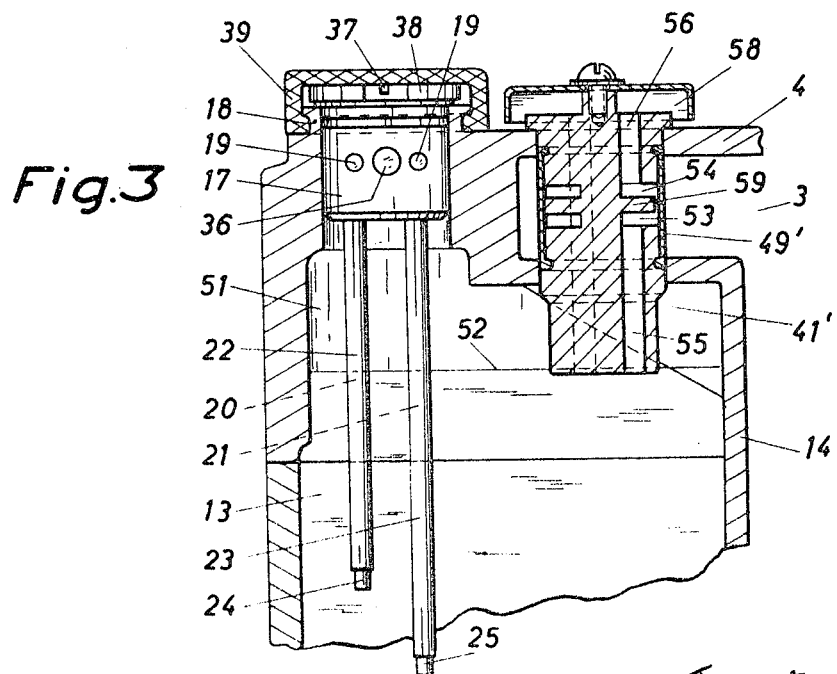
Figure 11:
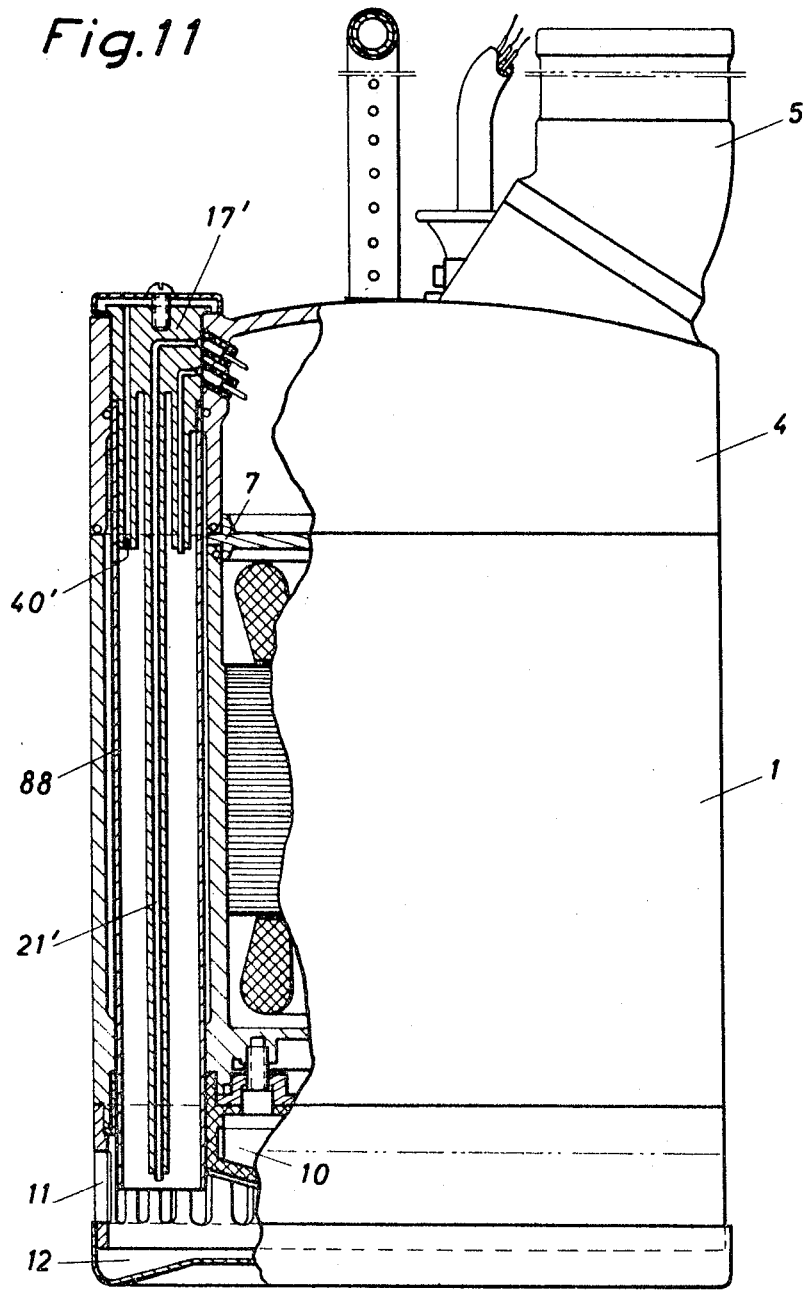

Further objects and advantages of the invention will become apparent from the following description considered in connection with the accompanying drawings which form part of this specification and of which:

FIG. 1 is a vertical longitudinal section through a pump driven by an electric motor and embodying the main features of the invention, a pair of electrodes being provided in the electrode chamber of the pump, FIG. 2 is a top view on a reduced scale of the pump, FIG. 3 is a vertical longitudinal section on a larger scale through the electrode chamber and its air outlet, FIG. 4 is a vertical section through the upper part of the electrode chamber and the stopper to which the upper ends of the electrodes are attached, FIG. 5 is a horizontal section on a still larger scale following line V—V of FIG. 4, FIG. 6 is a similar transverse section but with the stopper illustrated in another rotational position, FIG. 7 is a vertical longitudinal section through a valve disposed in the air outlet, FIG. 8 is a similar section through a valve constructed according to another embodiment, FIG. 9 is a lateral view of the valve connected to the carrying handle of the pump, FIG. 10 shows a wiring diagram, FIG. 11 is a longitudinal section through an electrode chamber made according to another embodiment of the invention.

The pump shown in the drawings comprises an outer casing 1, an inner casing 2, an annular flow channel 3 located therebetween and an upper part 4 closing the outer casing at the top thereof and provided with a discharge socket 5 for the pumped liquid. The inner casing 2 housing an electric motor 6 is closed at its ends by means of caps 7 and 8. Disposed at the lower end of shaft 9 of the electric motor 6 is a pump wheel 10, which rotates within an inlet chamber 12 for the liquid, said chamber being provided with inlet openings 11. A chamber 13 is by means of partition walls 14 delimited from the annular flow channel 3. The chamber 13 communicates with the inlet chamber 12 through a tube 15.

Introduced into a vertical bore in the upper part of the chamber 13 is a cylindrical stopper 17 made of some electrically non-conductive material, suitably plastic. The stopper 17 which is rotatably arranged within the bore 16 is in an air-tight manner sealed against the wall of the bore by means of O-ring 18. Two vertical electrodes 20, 21 of different lengths have their laterally projecting ends 19 fixed in the stopper 17, each of said electrodes being encased by a layer or a sleeve 22 and 23, respectively, of electrically non-conductive material in such a manner that only the lower ends 24 and 25, respectively, are uncovered. These ends are suitably covered with noble metal, such as platinum, for example. The partition wall 14 is passed by two conductors 26, 27 carrying each a contact pin 28 and 29, respectively, on their outer ends. The conductors 26, 27 and the contact pins 28, 29 are each embedded in a sleeve 30 made of rubber or other electrically insulating, elastic material so that the contact pins 28, 29, at their free ends engage notch 31. A sleeve-shaped short-circuiting pin 32 having a ball detent 33 at one end passes diametrically through the stopper 17. Said ball is pressed by means of a coiled spring 34 a distance out of the sleeve 32, but is prevented from leaving said sleeve entirely due to a collar-shaped, inwardly projecting annular flange 35 formed at the adjacent end of the sleeve. The opposite end of the sleeve is shaped into a head 36. By means of a screw-driver or a similar tool (not shown) insertible into a transverse tool recess 37 (FIG. 4) formed in the head 38 of the stopper 17, said stopper can be rotated from the position shown in FIG. 5 in which the electrode 20 is in contact with the pin 28 and the electrode 21 in contact with the pin 29, into the position shown in FIG. 6, where the pin 29 through the sleeve 32 is in short-circuit with the pump casing 1, which is connected to ground. The head 38 is enclosed by a hood 39 of some suitable elastic or resilient material, such as rubber or soft plastic, for example.

A tube or vent 40 opens according to FIG. 1 into the upper end portion of the electrode chamber 13 and is placed through a valve 41 in communication with the atmospheric air above the pump. According to the embodiment shown in FIG. 1, the valve 41 is with its upper end connected to a hollow carrying handle 42 of the pump which handle is provided with holes 43 for escape of air. As in shown in FIG. 7 in a larger scale, the tube 40 is at its upper end connected to a valve body 44 having an upper axial through-flow passage 45, two laterally directed channels 46 and 47 and an intermediate channel 48 extending in the longitudinal direction of the body 44. The valve body 44 is enclosed by a cylindrical membrane 49 made of rubber or some other resilient and suitably acid-proof material. A seat 50 is formed around the outer end of the channel 47. The valve is disposed in the channel 3 so that the membrane 49 is exposed to actuation by the working pressure prevailing in said channel.

When the pump under operation is immersed into the liquid to be pumped the liquid rises in the electrode chamber 13 up to the lower mouth of the tube 40. An air cushion 51 is thus formed in the upper end portion of the electrode chamber 13 so that the upper ends of the electrically insulating layers 22, 23 of the electrodes will not become wet. When the chamber 13 as described above is filled with liquid, except for the air cushion 51, the air driven upwards by the level 52 of the upwardly penetrating liquid is forced to escape through the air outlet formed by the tube 40 and the valve 41.

FIG. 8 shows another embodiment of the air outlet valve 41'. In this embodiment the valve body 44' is provided with two peripheral grooves 53, 54 encased by the sleeve-shaped membrane 49'. Several axial channels 55 extending outwardly to the one end of the valve body open into the groove 53, and several other channels 56 extending to the opposed end of the valve body open into the groove 54, said opposed end being covered by a hood 57 in such a manner that a channel 58 providing a connection with the ambient air is formed.

FIG. 3 shows how this valve 41' is inserted in the upper part 4 of the pump casing in such a manner that the membrane 49' becomes exposed to actuation by the working pressure in the flow channel 3 for the liquid run up by the pump. When the pump is not in operation or the pump wheel 10 rotates but does not draw up any liquid, the passage through the channels 55 and the grooves 53, 54 and the channels 56 and 58 is open, whereas when working pressure prevails in the flow channel 3, the membrane 49' is pressed against the wall 59 formed between the grooves 53 and 54 and serving as a seat, whereby the valve is closed and the connection between the electrode chamber 13 and the ambient air is interrupted.

FIG. 9 illustrates the connection of the valve 41' to the carrying handle 42. The axial channels 56 communicate through a recess 60 formed in one securing flange 61 of the carrying handle, a channel 62 formed in a socket 63 of said flange on which socket one end of the carrying handle 42 has been pushed, with the holes 43 formed in the wall of the tubular handle 42. By this arrangement coarser dirt particles are prevented from penetrating near to the valve 41', on the operation of which they otherwise could have a disturbing effect.

Referring now to the electric wire diagram shown in FIG. 10 the shorter electrode 20 serving as the starting electrode is diagrammatically represented in the lower right hand portion of the diagram and below said electrode the longer electrode 21 serving as holding electrode is shown. Also the wall 14 of the electrode chamber 13 has been represented. The chamber wall 14—or as the wire diagram shows an electrode 64 insulated from said wall—is through a conductor 65 connected to an intermediate terminal 66 on the secondary side of a transformer 68 which on its primary side 69 is connected to two phases 70, 71 of a three-phase power supply. The transformer 68 is suitably dimensioned so that at the intermediate terminal 66 a voltage of about 6 volts can be tapped whereas at point 72 a voltage of about 28 volts can be tapped. The electrode 20 is connected through a resistor 73 to the base 74 of a transistor 75, when stopper 17 is positioned as shown in FIG. 5. The emitter 76 of this latter is through another resistor 77 connected to the 0-terminal 78 of the transformer whereas the collector 79 of said transistor is connected through a diode 80 and third resistor 81 and the control coil 82 of the contactor or operating switch 83 of the pump motor 6 to the terminal 72 of the transformer. The holding electrode 21 is connected in parallel to the starting electrode 20 through a switch 84 mechanically connected with the armature of the coil 82.

The described device operates in the following manner:

When the liquid within the electrode chamber 13 rises to such a level as to cover the electrodes 20 and 64 current is supplied from the terminal 66 through the liquid present in the space between these two electrodes and through the resistor 73 to the base 74 of the transistor 75 which is caused to open or conduct. The whole secondary voltage of 28 volts from the transformer 68 is then impressed on the control coil 82, which thereby is caused to attract or close the contactor 83. The pump motor 6 is started. By the starting operation a pressure will be produced in the pump which results in a wave motion of the liquid level within the electrode chamber 13. It may then occur that the current circuit over the electrodes 20 and 64 is interrupted. Such current interruption would normally deenergize the control coil 82 and instantaneously interrupt the supply of current to the motor 6. As, however, the switch 84 is closed simultaneously with the closing of the contactor and since the electrode 21, which according to FIG. 10 is the longer one, continuously is immersed in the liquid within the electrode chamber, there is still voltage applied from the terminal 66 to the base 74 of transistor 75 which thus remains open. Thus, due to the holder contact 21 a smooth start of the motor 6 is obtained.

According to the wiring diagram of FIG. 10 a condenser 85 is connected in parallel within the control coil 82 and thus serves for equalisation of the voltage. If desired, the resistor 77 can be short-circuited over the points 86 and 87.

The valve, which under operation seals the air outlet 40 and thereby retains the liquid at a predetermined level within the electrode chamber until the liquid level outside the pump has been lowered so much that air can penetrate through the lower end of the tube 15, permits the use of relatively short electrodes 20, 21, which with their lower ends are located high above the pump chamber and the pump wheel 10 rotating therein. The lower ends of the electrodes thus are not exposed to actuation or wear by solid particles entrained by the liquid.

The invention includes also such an embodiment as is shown in FIG. 11 and according to which no valve is provided in the air outlet 40'. In this case it is necessary, as is evident from FIG. 11, to form the holding electrode 21 very long. It must extend vertically through practically the entire electrode chamber. According to this embodiment, the electrode chamber is constituted by a tube 88, which at its top is closed by means of a stopper 17' of electrically non-conductive material. The two electrodes 20, 21' are attached to the stopper 17' in the manner indicated above. The stopper may also be provided with a short-circuiting contact which is rotatable with stopper 17' into various positions to permit operation of the pump without automatic stop. Due to the location of the electrodes on a removable stopper both said electrodes and the electrode chamber can be cleaned, surveyed and adjusted when required.

Instead of equipping the electrode chamber 13 with a holding electrode the electric coupling may be provided with a delay device so that the control coil 82 remains energized even if due to splashing motions of the liquid level in the electrode chamber short current interruptions may occur between the electrodes or, if only one single electrode is used, between said electrode and the pump casing.

What I claim is:

1. In a pump having a flow chamber, an electrode chamber closed at its upper end and opening at its lower end on said flow chamber, and an electric motor for operating the pump to pump electrically conductive liquid through said flow chamber, means for stopping and starting said motor, comprising a switch in the starting circuit of said motor, a control coil for operating said switch, and a plurality of electrodes connected in circuit with said control coil, and disposed so as, when the liquid in said pump is present between them, to energize said coil and close said switch, thereby to start said motor, and when the liquid level in the pump falls below said electrodes, to de-energize said coil and open said switch, thereby to stop said motor, and a duct for venting said electrode chamber, said duct having an outer end opening on the exterior of the pump, and having an inner end opening on said electrode chamber and spaced below the upper end of said electrode chamber, and positioned so as to cause an air cushion to be formed in said electrode chamber above said inner end of the duct and the level of the liquid in the electrode chamber, when the liquid has risen therein high enough to close said inner end of the duct, at least one of said electrodes being connected at its upper end to a voltage supply, and projecting at its opposite end vertically downwardly into said electrode chamber and through said air cushion, so that at least the portion of said one electrode adjacent its voltage supply is kept dry and prevented from coming into contact with said liquid.

2. In the pump of claim 1, means for maintaining the liquid in said electrode chamber at a level to contact said one electrode until the level of the liquid in said flow chamber falls below the bottom of said electrode chamber.

3. In a pump having a flow chamber, and an electric motor (6) for operating the pump to pump electrically conductive liquid through said flow chamber, and provided with electrodes in an electric circuit, which also includes the control coil (82) of a switch (83) in the starting circuit of the electric motor, said electrodes being disposed so as, when liquid is present between them, to energize the control coil circuit and thereby to close the switch to start the motor, and when the liquid level falls below said electrodes, to interrupt the control coil circuit and thereby also to open the switch to stop the motor, an electrode chamber closed at the top and opening at its lower end on said flow chamber and provided with at least one substantially vertical electrode, said electrode chamber having an air outlet duct having an outer end opening on the exterior of the pump, and having an inner end opening on said electrode chamber and spaced below the upper end of said electrode chamber so as to cause an air cushion to be formed above said inner end of said duct and the liquid level in the electrode chamber, when the liquid has risen therein high enough to close said inner end of said duct, part of at least one of the electrodes extending through said air cushion, the electrode chamber (13) being closed at its top by means of a stopper (17) to which said one electrode is attached, and the stopper (17) being provided with a contact (32) adapted directly to short-circuit said electrodes.

4. In the pump of claim 3, sealing means (18) to airtighten the stopper (17) against the wall (14) of the electrode chamber (13) contact pins (28, 29) disposed in said wall, said stopper (17) being rotatable so as to bring one of said contact pins (29) into electrically conductive connection with the short-circuit contact (32).

5. In the pump of claim 4, each of said contact pins being located within its sleeve (30) made of a resilient and electrically insulating material.

6. In a pump having a flow chamber and an electric motor (6) for operating the pump to pump electrically conductive liquid through said flow chamber, and provided with electrodes in an electric circuit, which also includes the control coil (82) of a switch (83) in the starting circuit of the electric motor, said electrodes being disposed so as, when the liquid is present between them, to energize the control coil circuit and thereby to close the switch to start the motor, and when the liquid level falls below said electrodes, to interrupt the control coil circuit and thereby also to open the switch to stop the motor, an electrode chamber closed at the top and opening at its lower end on said flow chamber and provided with at least one substantially vertical electrode, said electrode chamber having an air outlet duct having an outer end opening on the exterior of the pump, and having an inner end opening on said electrode chamber and spaced below the upper end of said electrode chamber so as to cause an air cushion to be formed above said inner end of said duct and the liquid level in the electrode chamber, when the liquid has risen therein high enough to close said inner end of said duct, part of at least one of the electrodes extending through said air cushion, two vertically extending electrodes (20, 21) of different lengths disposed within the electrode chamber, the shorter of said electrodes (20) being adapted to act as starting electrode and the longer electrode (21) as holding electrode for holding the circuit through the control coil (82) of the switch energized through the liquid, even if the level of said liquid is slightly below the lower end (24) of the shorter electrode (20), the electrode chamber (13) being closed at its top by means of a stopper (17) to which the electrodes (20, 21) are attached.

7. In the pump of claim 6, the stopper (17) being provided with a contact (32) adapted directly to short-circuit the electrodes (20, 21).

8. In the pump of claim 7, sealing means (18) to airtighten the stopper (17) against the wall (14) of the electrode chamber (13), contact pins (28, 29) disposed in said wall, said stopper (17) being rotatable so as to bring one of said contact pins (29) into electrically conductive connection with the short-circuit contact (32).

9. In the pump of claim 8, each of said contact pins being located within its sleeve (30) made of a resilient and electrically insulating material.

10. In a pump having a flow chamber and an electric motor (6) for operating the pump to pump electrically conductive liquid through said flow chamber, and provided with electrodes in an electric circuit, which also includes the control coil (82) of a switch (83) in the starting circuit of the electric motor, said electrodes being disposed so as, when liquid is present between them, to energize the control coil circuit and thereby to close the switch to start the motor, and when the liquid level falls below said electrodes, to interrupt the control coil circuit and thereby also to open the switch to stop the motor, an electrode chamber closed at the top and opening at its lower end on said flow chamber and provided with at least one substantially vertical electrode, said electrode chamber having an air outlet duct having an outer end opening on the exterior of the pump, and having an inner end opening on said electrode chamber and spaced below the upper end of said electrode chamber so as to cause an air cushion to be formed above said inner end of said duct and the liquid level in the electrode chamber, when the liquid has risen therein high enough to close said inner end of said duct, part of at least one of the electrodes extending through said air cushion, a valve (41) in the air outlet duct and having an annular seat (59) enclosed by a sleeve-shaped membrane (49'), which is adapted through the action of a positive pressure prevailing in the electrode chamber (13) to enclose the annular seat in a sealing manner, said valve having on both sides of the annular seat (59) peripheral grooves (53, 54) together with axial channels (55, 56) opening into said grooves.

References Cited

UNITED STATES PATENTS

| | | | |
|---|---|---|---|
| 1,979,127 | 10/1934 | Warrick | 103—25 X |
| 2,656,794 | 10/1953 | Williamson | 103—25 |
| 2,782,016 | 2/1957 | Iannelli | 137—392 |
| 3,131,335 | 4/1964 | Berglund et al. | 137—392 |
| 3,340,892 | 9/1967 | Holland | 137—392 |
| 3,252,420 | 5/1966 | Sorensen | 103—25 |
| 3,303,785 | 2/1967 | Pearce | 103—25 |

WILLIAM L. FREEH, Primary Examiner

U.S. Cl. X.R.

137—392; 73—304